(No Model.) 4 Sheets—Sheet 1.
C. H. WRIGHT.
FARE INDICATOR AND RECORDER.
No. 559,922. Patented May 12, 1896.
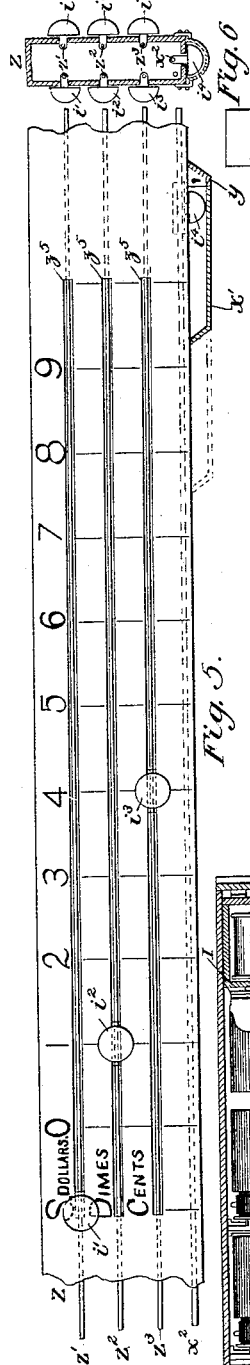
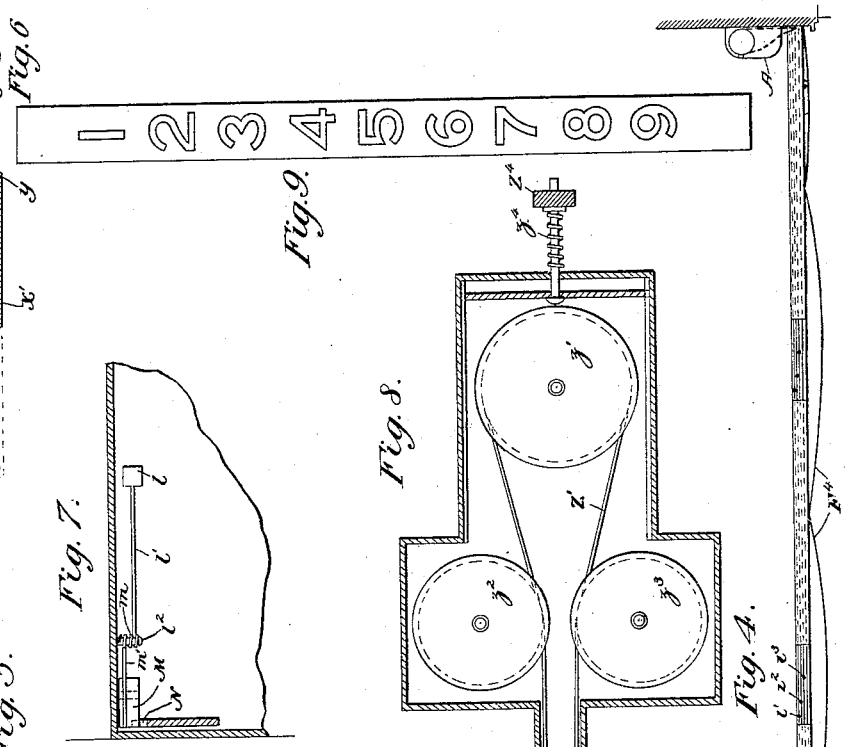
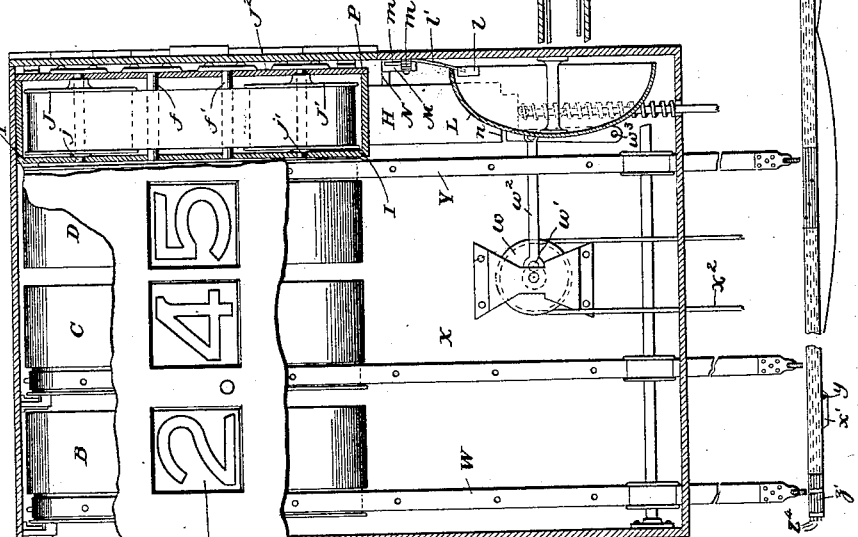
Witnesses:
Edw. D. Duvall Jr.
Elizabeth S. Poole
Inventor:
Clarence H. Wright
By Frankland Jannus
his Atty.

(No Model.) 4 Sheets—Sheet 2.

C. H. WRIGHT.
FARE INDICATOR AND RECORDER.

No. 559,922. Patented May 12, 1896.

Witnesses
Edw. P. Duvall Jr.
Elizabeth S. Poole

Inventor
Clarence H. Wright.
By Frankland Jannus
his atty.

(No Model.) 4 Sheets—Sheet 3.

C. H. WRIGHT.
FARE INDICATOR AND RECORDER.

No. 559,922. Patented May 12, 1896.

Witnesses.
Edw. S. Duvall Jr.
Elizabeth S. Poole

Inventor.
Clarence H. Wright.
By Frankland Jannus
his Atty.

(No Model.)  4 Sheets—Sheet 4.

C. H. WRIGHT.
FARE INDICATOR AND RECORDER.

No. 559,922.  Patented May 12, 1896.

Witnesses.
Edw. D. Duvall Jr.
Elizabeth S. Poole.

Inventor
Clarence H Wright.
By Frankland Jannus,
his atty.

UNITED STATES PATENT OFFICE.

CLARENCE H. WRIGHT, OF CHICAGO, ILLINOIS.

FARE INDICATOR AND RECORDER.

SPECIFICATION forming part of Letters Patent No. 559,922, dated May 12, 1896.

Application filed November 29, 1895. Serial No. 570,521. (No model.)

*To all whom it may concern:*

Be it known that I, CLARENCE H. WRIGHT, a citizen of the United States, residing at Chicago, in the county of Cook and State of Illinois, have invented certain new and useful Improvements in Fare Indicators and Recorders, of which the following is a description, reference being had to the accompanying drawings, and to the letters of reference marked thereon.

My invention relates to improvements in indicators and recorders of the class employed to indicate and record the fares collected by the conductor of a street-car or similar vehicle and known as "fare-registers," the details of construction of which, together with the novel features thereof, will be hereinafter described, and pointed out in the claims.

Figure 2:
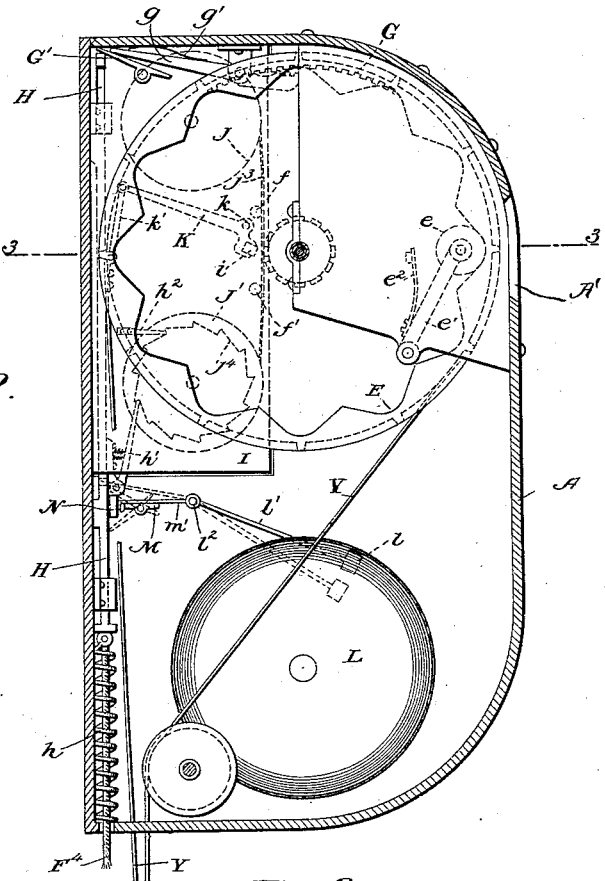
Figure 3:
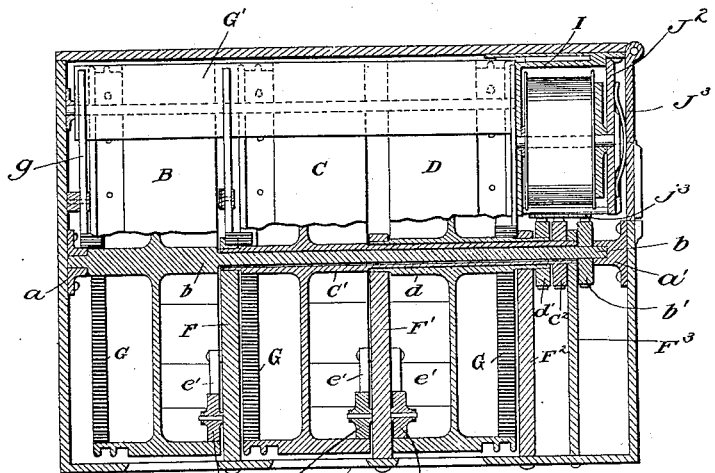
Figure 10:
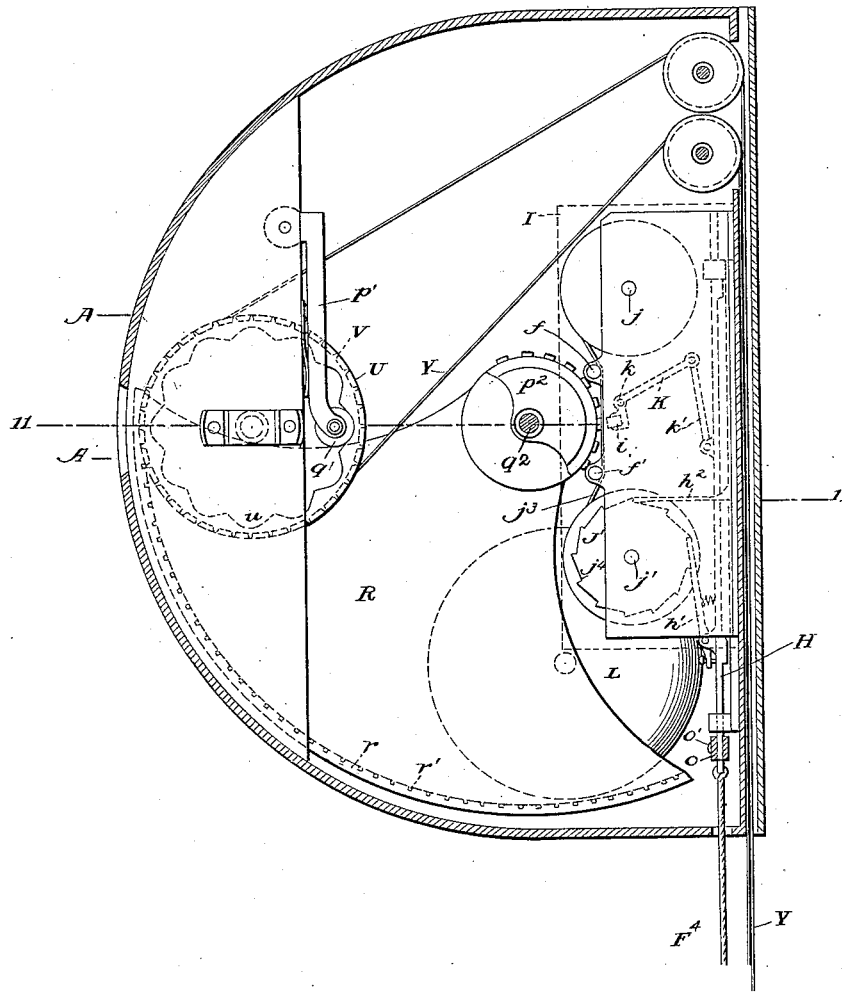
Figure 11:
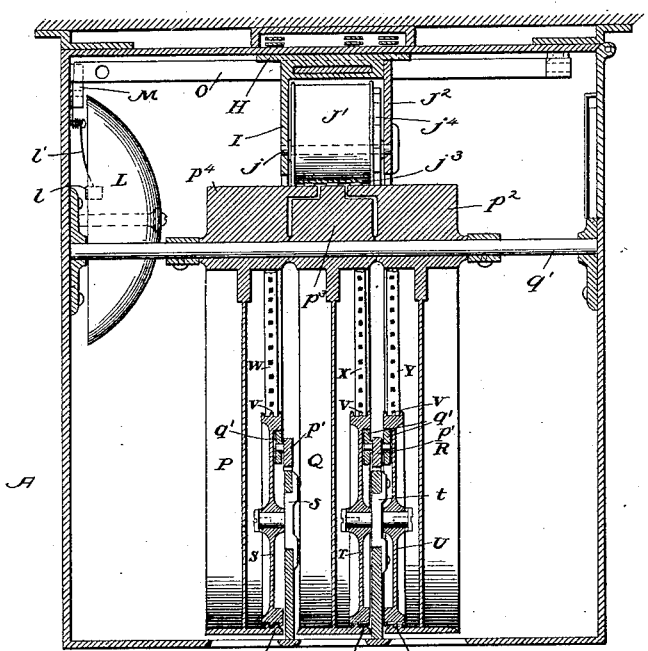
Figure 12:
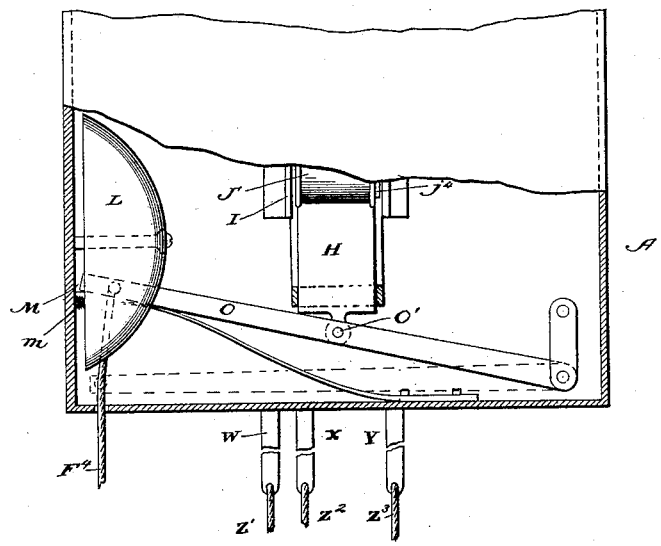

In the accompanying drawings, Figure 1 is a front elevation of the indicating and recording mechanism, partly in section. Fig. 2 is a side elevation thereof, partly in section, and also showing some of the parts in dotted lines. Fig. 3 is a top plan view of the indicating and recording mechanism on the line 3 3 of Fig. 2. Fig. 4 is a side view of the indicating, registering, and adjusting mechanism in operative relation. Fig. 5 is an enlarged detail of the flexible connections for adjusting the indicating mechanism. Fig. 6 is a cross-sectional view of what is seen in Fig. 5. Fig. 7 is a detail of the bell-ringing mechanism. Fig. 8 is an enlarged detail of the tension mechanism for the indicator-operating connections. Fig. 9 is a plan view of the face of one of the visual indicators. Fig. 10 is a side elevation, partly in section, showing the slightly-modified form of the indicating and recording mechanism. Fig. 11 is a view on the line 11 11 of Fig. 10. Fig. 12 is a front elevation of the mechanism shown in Fig. 10 broken away to show the interior of the lower portion thereof.

The indicator and recorder is designed to be placed at one end of the car or coach and to be operated from any point therein by means of wires or wire cords running the length of the car from the mechanism of the indicator and recorder through a conduit-box suspended within easy reach of the conductor.

The mechanism embodying the indicating and recording part of my invention is assembled in a case or box A, which is adapted to be secured in some conveniently visible portion of the interior of a car. Within the case A is arranged mechanism for visually indicating the amount to be recorded, which amount is then recorded by printing mechanism not in sight or accessible except to authorized persons, and at the same time ringing a bell to announce the fact that the figures seen have been recorded.

As indicated in Figs. 1, 2, and 3, three visual indicators in the form of wheels B C D are rotatably mounted in bearings $a$ $a'$, (see Fig. 3,) attached to the case A. The desired characters upon the faces of the visual indicators are displayed one at a time for each indicator through parallel openings or a single large opening A' in the front of the case A, as shown in Fig. 1, where the numerals "2," "4," and "5" are shown each upon one of the adjustable indicators.

The shaft $b$ of the wheel B is mounted at its ends in the bearings $a$ $a'$. The shaft C' of the wheel C is tubular and is sleeved upon the shaft $b$ and sustained in bearings carried by hangers F F², secured to the case A. The shaft $d$ of the wheel D is also tubular, is sleeved upon the tubular shaft C', and carried in bearings in the hangers F' F³, also secured to the case A. Type-wheels are carried by each of these shafts, and for the purpose of bringing said type-wheels close together, so that they may print on a narrow strip, they are arranged at one side of the apparatus, type-wheel $b'$ being affixed to shaft $b$, type-wheel C² to shaft C', and type-wheel $d'$ to shaft $d$, from which it will be apparent that rotation of either one of the wheels B C D will cause corresponding rotation of its type-wheel without affecting either of the others.

Each one of the indicator-wheels B C D is formed with an undulating surface or scallops E, as seen in Fig. 2, on the inside of the rim thereof. A pivoted roller $e$, adapted to fit into the scallops E, is mounted upon a suitable arm $e'$, which is pivotally attached to one of the shaft-hangers F F' and pressed against the scallops in the wheel by a spring $e^2$. The interior of the rim of each indicator-wheel is also provided with a circular rack G. (See Fig. 3.) Detent-levers $g$ are pivotally supported in the upper part of the case and notched at their inner extremity to engage the teeth of the racks G and are normally held away therefrom by the recorder-actuating mechanism and move under pressure of spring g' into engagement with the racks to hold the indicator-wheels in the desired position whenever released.

A tilting plate G' is pivoted in the upper part of the case and extends across the same, so as to engage the outer ends of all of the levers g. The plate G' rests upon the vertically-moving plate H and is raised, holding the levers g out of operative position, when the plate H is in its elevated position or not being used, when the visual indicators B C D are free for adjustment.

The recorder-operating mechanism referred to comprises a vertically-moving plate H, mounted in the back of the case and normally held in raised position by spring h, which may be arranged under its lower extremity. The plate H carries connections which actuate the printing mechanism and ring the bell, as will appear.

In the upper part of the rear of the case is permanently secured the supporting-plate I, which is on one side of the vertically-moving plate H and at right angles thereto and is desirably formed with rectangularly-bent end pieces.

A reel J and a spool J' are rotatably secured to the plate I and to a second plate $J^2$, which, as shown in Fig. 1, fits against the outturned ends of the plate I, and said plates I and $J^2$ are suitably apertured to receive the inner ends of the spindles j j' of the spool and reel J J' and the paper-guiding pins f f'. A door $J^3$, (see Fig. 3,) provided with suitable lock, is hinged to the side of the case, covering a suitable opening over the reel and spool and the plate $J^2$, to which they are attached, so that when said door is opened the reel, spool, and plate $J^2$ may be removed therethrough together. The reel and spool carry a continuous strip of paper $j^3$, which extends across the faces of the type-wheels and is further held in position by pins f f'. The reel J' is provided with ratchet-teeth $j^4$, and the plate H carries a pawl h', adapted to engage the same to impart a step-by-step rotary movement thereto each time the plate is forced upward. A holding-pawl $h^2$, attached to some stationary part, also engages the ratchet-teeth $j^4$ and prevents back movement of the reel when the pawl H' is advancing to the next tooth.

The printing-levers K, (see Figs. 2 and 10,) one for each indicator-wheel, are pivotally supported at k and connected at their outer ends by links k' with the vertically-moving plate H, and each is provided at its inner extremity with a small block i, of rubber or other suitable material. The paper strip $j^3$ passes between the block i of the printing-levers K and the faces of the type-wheels, so that when the plate H is drawn downwardly the printing-levers will be moved into position to press the paper strip against the faces of the type-wheels and thereby imprint a record thereon.

The bell L is secured within the lower part of the case A, and the striker for ringing the same is shown in detail in Fig. 7. The bell-striking mechanism comprises the hammer l, secured to lever l', which should be somewhat resilient. The lever l' is secured to a pivoted stud $l^2$. A helical spring m is coiled about the stud $l^2$ and fixed to its support, so as to normally press the hammer toward the bell. An arm m' of the spring m is also fixed to the stud $l^2$ and extends rearwardly therefrom, resting upon a pivoted lever M. A lug N extends laterally from the vertically-moving plate H and is adapted to strike the edge of the lever M near its end, and in so doing said lever is tilted, raising the arm m' and placing the spring m under tension. As the plate H reaches the lower part of its movement the lug N slips off the lever M, allowing it to resume its horizontal position, which it does suddenly. At the same time the arm m' drops flat upon the lever M, allowing the spring m to throw the lever l' and bell-hammer upward, the momentum thereof, together with the resiliency of said arm l', allowing the hammer to strike the bell. As shown in Fig. 12, the lever M is actuated by the extremity of the lever O, effecting the same purpose.

Bell-striking mechanism may be variously constructed to accomplish the purpose herein sought. I therefore do not limit myself to the details set forth.

The visual indicators need not necessarily be complete wheels, since segments having sufficient surface to carry the desired characters would answer the purpose equally well. Such an arrangement is shown in Figs. 10 and 11, in which the segments P Q R take the place of the wheels B C D of Figs. 1, 2, and 3. The printing mechanism remains the same. The segments P Q R have wide faces to carry the characters to be displayed, and on the inside of each of their faces are formed flanges p q r, provided with perforations r'. For each of the indicator-segments is provided a relatively small driving-wheel S T U, the peripheries of which are formed with sprocket-teeth V, which engage the perforations of the interior of the flanges of the indicating-segment, admitting between them the perforated steel bands W X Y of the setting mechanism. The driving-wheels S T U are rotatably supported in hangers s t, secured to the case. Each one of the driving-wheels S T U is formed with scallops u on the interior of its rim, and said scallops are engaged by a roller q', carried by lever p', which is pivotally mounted upon a fixed support and pressed against the rim of the driving-wheel by a suitable spring and holds the roller q' against the undulating inner surface of the flanges of the driving-wheels, where they serve to stop and hold the segmental indicators when the character which it is intended to display is exactly in front of the sight-opening in the front of the case. Segmental type-wheels $p^2$ $p^3$ $p^4$ are rigidly secured upon the shaft $q'$, upon which the indicator-segments are mounted, and the type-characters carried by the type-wheels correspond in position to the characters and positions upon the faces of the segments, so that the printed record will correspond with the characters shown by the segmental indicators at the openings in the front of the case.

As described, the indicator-wheels and indicator-segments are so mounted that they may be set so as to display any desired character which is painted upon their faces at the openings in the front of the case. Means for stopping and holding the wheels and segments in any of their desired positions has also been set forth. The printing mechanism has been described. Separate and apart from this is the means for setting the visual indicators. Flexible connections, preferably in the form of steel tapes W X Y, (see Fig. 1,) suitably perforated, are passed around the sprocket-surfaces of the indicator-wheels and the driving-wheels of the indicator-segments and extend out from the case A. Extending along the wall or roof of the car or apartment in which the recorder is to be used is a conduit Z, Fig. 4. The indicator-actuating bands, wires, or cords are extended through the conduit Z from the recorder and in parallel lines and preferably in the form of steel wires, although cords or bands of any description may be used, and the bands of whatever material are preferably endless. The wires $Z'$ $Z^2$ $Z^3$, which form continuations of the bands W X Y, pass along the conduit parallel with each other and at its rear end are carried over tightening-pulleys $z'$ and guide-pulleys $z^2$ $z^3$. (Shown on an enlarged scale in Fig. 8 and indicated at the rear end of Fig. 4.)

The tightening-pulleys are each longitudinally adjustable and are provided with tension-springs $z^4$ and the adjusting-nut $Z^4$. As indicated on the enlarged scale in Fig. 5, the bands are arranged at the sides of the conduit, and at convenient places upon the exterior of the conduit slots $z^5$ are provided, through which extend the shanks of indicator-operating buttons $i'$ $i^2$ $i^3$, which are secured to the endless bands $Z'$ $Z^2$ $Z^3$ within the conduit. The slotted spaces upon the conduit are subdivided and marked with figures or numbers, or both, corresponding with the characters upon the visual indicators, the position of which is controlled by the bands and indicated by the buttons attached thereto, so that in order to adjust either one of the indicator wheels or segments the operator moves the button attached to the band connected therewith to the desired position, when the corresponding character will be shown at the opening $A'$ in the face of the recorder.

The indicating devices must be adjusted for each fare only when it is different in amount from that shown by the indicating devices, which retain their positions irrespective of the operation of the recording mechanism and will indicate the same amount as often as desired until readjusted by their setting mechanism to show other figures.

In order to prevent unauthorized persons from tampering with the apparatus, a locking device is provided. Button $i^4$ at the lower part of the conduit is inclosed within a casing $x'$, which is provided with locking mechanism $y$, preventing access thereto. The cord $x^2$, to which the button $i^4$ is attached, also extends into the case A and passes over a wheel $w$, Fig. 1, which is provided with a crank $w'$, upon which is a connecting-rod $w^2$, which is pivotally connected to the rocking lever $w^3$, pivoted to the inner part of the casing A in such position that it may be thrown, by partial rotation of wheel $w$, so as to engage the lower corner $n$ (see Fig. 1) of the vertically-moving plate H, and thereby prevent downward movement thereof. This can be readily accomplished by sliding the locking-button $i^4$. The locking-lever $w^3$ will be drawn to one side out of the path of the vertically-moving plate H by corresponding movement of the locking-button.

Below the conduit, or in any other more convenient place, is suspended a bell-cord $F^4$, which is attached directly to the vertically-moving plate H or to the corresponding lever O for operating the recording mechanism and ringing the bell for the visual indicators and their type-wheels, the adjusting-bands in the conduit having been employed to place the indicators and printing mechanism in position to make the desired record.

The visual indicators, whether wheels or segments, carry on their faces characters which will show dollars, dimes, and cents read in the usual manner. I may also add characters to indicate stations upon the line of travel, and this can very conveniently be done by adding simply the letter "S" and designating the stations by numbers. For instance, as indicated in Fig. 5, when the adjusting-buttons are in the position there shown the record-strip would show "S 14," meaning "Station 14," the letter S being omitted when fares are recorded. In this way the record can be made to show between what points the amounts subsequently recorded were collected. Any characters, however, may be placed upon the visual indicators and the type-wheels.

The actual record printed upon the record-strip may be made in any well-known way. The type may impress a record upon the strip without inking, or an ink-impression may be produced by simply winding a type-writer ribbon or a strip of carbon-paper or their equivalent upon the spools, together with the record-strip. Methods of inking are well known and are therefore not shown, as any convenient known device for this purpose may be employed.

While I have described the means illustrated for carrying my invention into effect, it must be understood that many of the details thereof might be varied by persons skilled in the art, and in view of the foregoing without departing from the invention.

Having described my invention, what I claim is—

1. In a fare indicator and recorder, rotatably-mounted visual indicators and independent means connected with each indicator and extending from the indicator and recorder to a convenient point or points, at a distance from the indicator and recorder and within reach of the conductor, for setting the indicators to expose the desired characters to view said means for setting the indicators being provided with scales, whereby the characters to be exposed by the indicators may be determined from distant points.

2. A fare indicator and recorder comprising rotatably-mounted visual indicators, a type-wheel connected with and moving in accordance with each indicator, independent means connected with each indicator and extending away therefrom for setting the indicators and type-wheels from a distant point, printing mechanism for recording the adjusted positions, and means for actuating such printing mechanism separately and also from a distant point.

3. In a fare indicator and recorder comprising separate rotatably-mounted indicator devices, type-wheels secured to and moving therewith, connections for adjusting each indicator device from points at a distance from the indicator and recorder, a record-strip, means for moving the same across the faces of the type-wheels and separately-actuated mechanism for impressing the strip against the type-wheels for imprinting thereon a record corresponding with the characters exhibited by the indicator devices.

4. In a fare indicator and recorder having visual indicators and type-wheels connected to and moved in accordance therewith, a record-strip, supporting and actuating mechanism for delivering the same across the faces of the type-wheels, means for removably supporting said record-strip in its operative position, printing-levers for impressing the strip against the type-wheels, means for actuating said levers comprising the vertically-moving plate and the driving and holding pulleys connected therewith and a flexible connection therefrom extending from the said vertically-moving plate into the car.

5. A fare indicator and recorder comprising rotatably-mounted visual indicators, a type-wheel connected to and moving in accordance with each indicator, independent means connected with each indicator device and extending from the indicator and recorder, for setting the indicators in the desired positions, a strip for receiving impressions from the type-wheels, printing mechanism for impressing the strip upon the type-wheels, a vertically-moving part and connections for actuating the printing mechanism and moving the paper strip, and a connection extending from said moving part for actuating the same.

6. A fare indicator and recorder comprising rotatably-mounted visual indicators, a type-wheel connected to and moving with each of said indicators and carrying corresponding characters, a record-strip for receiving impressions from said type-wheels, a bell, printing-levers for compressing the paper against the type-wheels, a vertically-moving part and connections for actuating the bell and the printing mechanism, and a cord or similar connection for operating the same.

7. In a fare indicator and recorder, the combination with separate indicator devices, of connections secured thereto and extending away from the indicator and recorder, an indicating-scale separate from, and at a distance from, and corresponding with the characters upon the indicator devices and adjusting devices, secured to the indicator connections and arranged in proximity to said scale, whereby the connections may be manipulated and the indicator devices moved from a distance in accordance with the characters marked upon the scale.

8. In a fare indicator and recorder, visual indicators rotatably mounted in a suitable case, setting devices connected with each indicator and extending therefrom, a conduit extending into the body of the car and containing the indicator connections, a scale or scales upon the exterior of the conduit corresponding to the characters upon the indicators, and adjusting devices secured to the connections and extending and adjustable along the scale or scales, whereby the indicators in the indicator and recorder may be set to expose characters corresponding with those adjacent to the adjusting devices upon the scale or scales.

9. The combination with a fare indicator and recorder having separately-movable indicating devices, of a conduit extending through a car, flexible connections, as endless bands, connected to the visual indicators and carried in the conduit, a scale or scales upon the exterior of the conduit distant from the indicator and recorder and corresponding with the characters upon the indicating devices of the indicator and recorder, whereby by setting the buttons upon the scales the positions of the indicator devices may be adjusted as desired.

10. In a fare indicator and recorder, the combination with the separately-movable indicator devices, the bands for moving the same, the conduit for retaining and supporting said bands, of guiding-pulleys $z^2$ $z^3$ and adjusting devices comprising pulley $z'$, nut $Z^4$ and spring $z^4$ for determining the tension of the bands.

11. In a fare indicator and recorder, the combination with rotatably-mounted indicator devices and type-wheels moving therewith, of a spool carrying a record-strip, a reel for receiving the same, printing-levers for impressing the paper against the type-wheels, pawls for actuating the reel, a bell, a vertically-moving part and connections between said part and the printing-levers, reel-actuating pawls and bell-striker, and a cord extending from the indicator and recorder for operating the same.

12. The combination with a fare indicator and recorder having separately-operated parts, of a conduit separate from the indicator and recorder and extending therefrom into the body of the car, endless bands actuating separate parts of the indicator and recorder and supported within said conduit, tension devices connecting with said conduit for adjusting the tension of said bands, an indicator scale or scales upon the outside of the conduit, buttons secured to the bands and extending through the sides of the conduit and appearing upon the scale, whereby the bands and the parts connected thereto may be adjusted as desired.

13. In a fare indicator and recorder, the combination of independently manually-adjusted indicator devices, a recording mechanism, means for actuating the recording mechanism, connections extending from the indicator and recorder to a point or points distant therefrom for setting the indicator devices and a separate connection for locking the printing mechanism.

14. In a fare indicator and recorder, the combination with rotatably-mounted indicator devices and type-wheels moving therewith and separate setting devices therefor extending away from the indicator and recorder into the body of the car, a printing mechanism, a record-strip arranged to pass between the type-wheels and the printing mechanism, a removable frame, a spool carrying the record-strip and a reel for winding the same from the spool, the reel and spool rotatably secured to and removable with the frame, mechanism comprising a vertically-moving part and holding and driving pawls within the indicator and recorder for actuating the printing mechanism and for rotating the reel, and means separate from and extending away from the indicator and recorder for operating the printing and winding mechanism.

In testimony whereof I hereto affix my signature in presence of two witnesses.

CLARENCE H. WRIGHT.

Witnesses:
WILLIAM H. BROWN,
CHARLES F. BROWN.